United States Patent [19]

Betts et al.

[11] Patent Number: 4,612,509

[45] Date of Patent: Sep. 16, 1986

[54] FREQUENCY SHIFT KEYED DEMODULATOR

[75] Inventors: William L. Betts, St. Petersburg; Wesley H. Smith; Michael R. Deakley, both of Largo, all of Fla.

[73] Assignee: Paradyne Corporation, Largo, Fla.

[21] Appl. No.: 457,521

[22] Filed: Jan. 13, 1983

[51] Int. Cl.$^4$ .............................................. H04L 27/14
[52] U.S. Cl. ..................................... 329/50; 329/124; 329/145; 375/88; 375/94
[58] Field of Search .................. 329/50, 104, 107, 110, 329/122, 124, 145; 375/45, 47, 88, 90, 94

[56] References Cited

U.S. PATENT DOCUMENTS

| | | | |
|---|---|---|---|
| 3,568,067 | 3/1971 | Williford | 329/124 X |
| 4,031,669 | 6/1977 | Koide et al. | 51/142 |
| 4,193,033 | 3/1980 | Voorman | 375/88 |
| 4,344,178 | 8/1982 | Waters | 329/50 X |
| 4,506,228 | 3/1985 | Kammeyer | 329/107 |

*Primary Examiner*—Siegfried H. Grimm
*Attorney, Agent, or Firm*—Kane, Dalsimer, Kane, Sullivan & Kurucz

[57] ABSTRACT

This invention relates to a demodulator for an FSK signal having a baud rate which is independent of the signal's bandwidth. The demodulator multiplies the received FSK signal with two quadrature signals having a frequency which lies between the two frequencies of the FSK signal, to obtain the real and imaginary components of a phasor. The phasor rotates in the complex plane, the direction of the rotation depending on whether the frequency of the quadrature signals is above or below the frequency of the received signal. The demodulator determines the direction of rotation of the phasor and generates binary data corresponding to the frequency change in the FSK signal.

7 Claims, 4 Drawing Figures

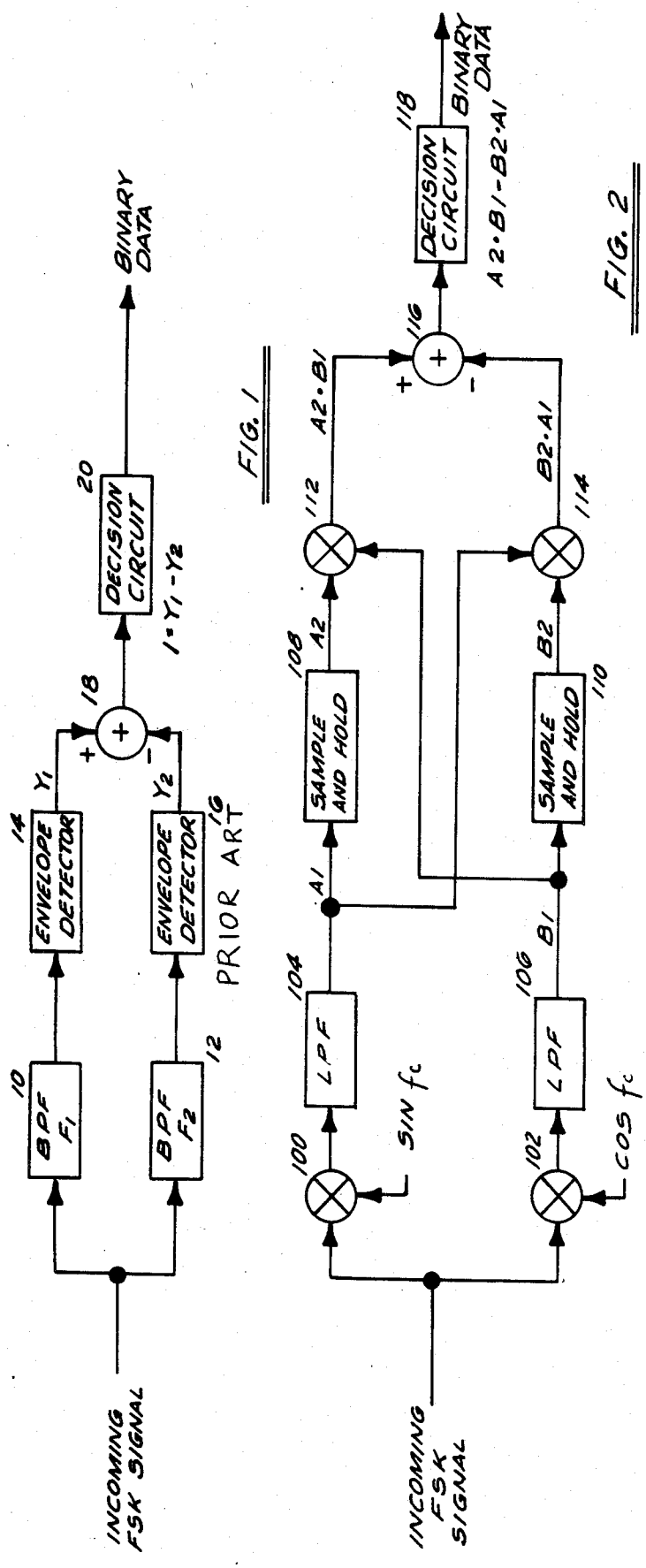
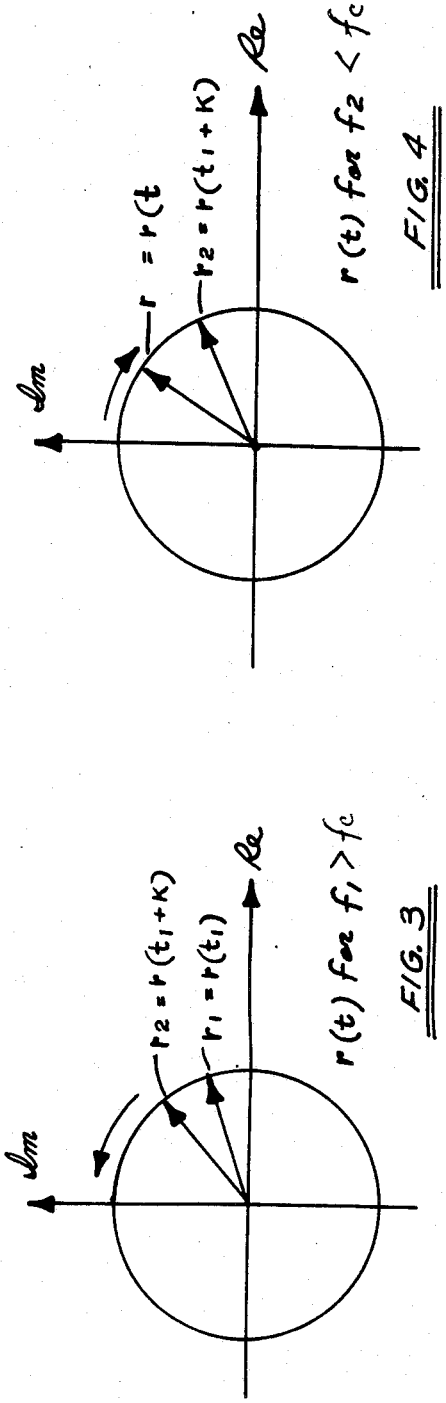

FREQUENCY SHIFT KEYED DEMODULATOR

BACKGROUND OF THE INVENTION

This invention pertains to digital data demodulators and more particularly to a demodulator for FSK-type signals.

Frequency-shift keying (FSK) is a method of transmitting binary (i.e. digital) data by changing the frequency of the signal between a higher and lower frequency $f_1$ and $f_2$ respectively in accordance with the binary value of the data. A typical demodulator for such a system is shown in FIG. 1. In such a demodulator the incoming FSK signal is fed simultaneously into a first bandpass filter 10 and a second bandpass filter 12. Bandpass filter 10 is adapted to pass only signals having a frequency of $f_1$ while bandpass filter 12 passes only signals having the frequency $f_2$. The outputs of the filters are fed into two envelope detectors 14 and 16 respectively which produce two signals $y_1$ and $y_2$. These signals are respectively proportional to the amplitudes of the signals having the frequencies $f_1$ and $f_2$. Signals $y_1$ and $y_2$ are fed into an adder 18 which produces a signal $Z = y_1 - y_2$. Signal Z is fed to a decision circuit 20 which produces either a binary "1" or a binary "0" depending on whether Z is greater than or less than zero, i.e. whether the received signal had the frequency $f_1$ or $f_2$.

One of the drawbacks of such a demodulator is that its output baud rate, and therefore the baud rate of the whole system is limited to about half the bandwidth of the signal. Therefore in order to increase the baud rate of the system, its bandwidth must be increased.

OBJECTIVES AND SUMMARY OF THE INVENTION

In view of the above, an objective of the present invention is to provide a demodulator with a baud rate which is not limited by the bandwidth of the FSK signal.

A further objective is to provide a demodulator which comprises readily available components.

These and other objectives are achieved by a demodulator in which the received signal is multiplied by two quadrature signals waves having a frequency $f_c$ which is between $f_1$ and $f_2$, to form respectively an in-phase or real component, and an out-of-phase or imaginary component of a complex phasor. The phasor defined by the components is time-variable and it rotates in the clockwise direction in the complex plane if the received signal has the lower frequency $f_2$, and in the counterclockwise direction if the received signal has the frequency $f_1$. The demodulator further comprises means of determining the direction of rotation of said phasor.

BRIEF DESCRIPTION OF THE DRAWINGS

FIG. 1, as previously described, shows a demodulator as taught by the prior art;

FIG. 2 shows the demodulator in accordance with the present invention;

FIG. 3 is a representation of a phasor in the complex plane corresponding to an FSK signal having a higher frequency;

FIG. 4 is a representation of a phasor similar to the phasor of FIG. 3, but corresponding to a lower frequency signal.

DESCRIPTION OF THE PREFERRED EMBODIMENT

An FSK signal may be conveniently represented as having a high frequency $f_1 = f_c + f_o$ and a lower frequency $f_2 = f_c - f_o$ where $f_c$ may be referred to as the carrier frequency and the bandwidth of the FSK signal is $2f_o$.

The elements of the present invention are shown in FIG. 2. The incoming signal (after it has passed through automatic gain control and other signal conditioning circuits not shown), is fed into two multipliers 100 and 102. In multiplier 100, the signal is multiplied by a sine wave having the frequency $f_c$, while in multiplier 102 the signal is multiplied by a cosine wave of the same frequency $f_c$. The outputs of the multipliers are fed respectively into two low-pass filters 104 and 106 to eliminate harmonics generated by the multipliers. As previously discussed, the outputs of the two low-pass filters represent the components of a complex phasor having as its in-phase or real component the output of low-pass filter 104, and the output of the other low-pass filter 106 as its imaginary component. On a complex plane, the time-varying phasor r(t) may be represented as a phasor which is rotating in a counterclockwise direction (see FIG. 3) if the incoming signal is larger than $f_c$, and in a clockwise direction (see FIG. 4) if the incoming signal is smaller than $f_c$.

In other words assume that the incoming signals at time $t_1$ and time $t_2 = t_1 + k$ are represented by two phasors $r_1$ and $r_2$ wherein $r_1$ represents the signal at time $t_1$, i.e. $r_1 = r(t_1)$, and $r_2$ represents the signal a short period of time k after $t_1$, i.e. $r_2 = r(t_1 + k) = r(t_2)$. If between $t_1$ and $t_2$ the frequency of the incoming signal was $f_1$, then, as shown in FIG. 3 $r_2$ is rotated in the counterclockwise direction with respect to the relative orientations of $r_1$. On the other hand if between $t_1$ and $t_2$ the frequency of the incoming signal was $f_2$, then, as shown in FIG. 4 $r_2$ is oriented clockwise with respect to $r_1$.

Therefore the frequency of the received FSK signal is easily determined by the angular or phase relationships of $r_1$ and $r_2$. This is accomplished by feeding each component respectively into sample-and-hold circuits 108 and 110 which delay the real and imaginary components of r(t) components for a period k and cross-multiplying the real and imaginary components of $r_1$ and $r_2$. Thus, if $$r_1 = a_1 + jb_1,$$

and $$r_2 = a_2 + jb_2$$

then two signals $X_1$ and $X_2$ are formed defined by $$X_1 = b_1 \times a_2 \text{ and}$$

$$X_2 = a_1 \times b_2$$

By the elementary rules of complex algebra, if $X_2$ is larger than $X_1$ then $r_2$ is oriented in the counterclockwise direction with respect to $r_1$, i.e. the frequency of the incoming signal is $f_1$. Conversely, if $X_2$ is smaller than $X_1$ then $r_2$ is oriented clockwise with respect to $r_1$, i.e. the frequency of the incoming signal is $f_2$.

Accordingly, products $X_1$ and $X_2$ are formed in multipliers 112 and 114 and then fed into adder 116 to form a signal $Z = X_1 - X_2$. Next, signal Z is fed into a decision circuit 118 which generates binary data in accordance with the relative magnitudes of $X_1$ and $X_2$.

It is important to note that while all the above signal manipulations may be performed by using well-known analog circuits, it is much more convenient to use digital circuitry. This is especially advantageous if the demodulator is part of a modem having other digital circuits because the demodulator may be easily interphased therewith. When digital circuits are used, the delay k between consecutive phasors, $r_1$ and $r_2$ is chosen to be an integer multiple of the sample rate of the circuits.

Regardless of whether analog or digital circuits are used, the speed of the demodulator, and its baud rate, is limited by its ability to differentiate between the two phasors $r_1$ and $r_2$ separated by time interval k. The bandwidth of FSK signal has no direct relationship to the baud rate.

The frequency of the sine and cosine waves which are provided for multipliers 100 and 102 has been specified in the above description as being equal to the center or carrier frequency of the FSK signal, however, any frequency between $f_1$ and $f_2$ would do, the difference being that in the rate of rotation of the r phasors corresponding to frequencies $f_1$ and $f_2$.

It is clear from the description that numerous modifications may be made from the invention without departing from its scope as defined in the appended claims.

We claim:

1. A demodulator for an input signal which is frequency-shift between a higher frequency $f_1$ and a lower frequency $f_2$, comprising:
   first means for multiplying said input signal with a first signal having a predetermined frequency fc between said $f_1$ and $f_2$ to produce a first component;
   second means for multiplying said input signal with a second signal in quadrature with said first signal to produce a second component, said first and second components defining a phasor in a complex plane which rotates in a first direction if the input signal has a frequency $f_1$, and in a second direction if said input signal has a frequency $f_2$;
   first delay means for delaying said first component by a period k to produce a first delayed component;
   second delay means for delaying said second component by a period k to produce a second-delayed component; and
   means for determining the direction of rotation of said phasor having third means for multiplying said first component with said second delayed component to obtain a first product, fourth means for multiplying said second component with said first delayed component to obtain a second product, and an adder for summing said first and second products.

2. The demodulator of claim 1 wherein said determining means further comprises a decision circuit for generating output binary data in accordance with the output of said adder.

3. The demodulator of claim 1 wherein said first and second delay circuits comprise corresponding sample-and-hold circuits.

4. A demodulator for converting an FSK-type data signal varied between frequencies $f_1$ and $f_2$ to binary data comprising;
   a first multiplier for multiplying the signal with a sine wave having a frequency $f_c$ between $f_1$ and $f_2$,
   a second multiplier for multiplying the signal with a cosine wave having the frequency $f_c$;
   a first low-pass filter for filtering the output of said first multiplier;
   a second low-pass filter for filtering the output of said second multiplier;
   a first sample-and-hold circuit for delaying the output of said first filter;
   a second sample-and-hold circuit for delaying the output of said second filter;
   a third multiplier for multiplying the output of said first sample-and-hold circuit with the output of said second filter;
   a fourth multiplier for multiplying the output of said second sample-and-hold circuit with the output of said first filter;
   an adder for adding the output of said third multiplier to the negative output of said fourth multiplier; and
   a determining circuit which generates binary data in accordance with the output of said adder.

5. The demodulator of claim 4 wherein said multipliers, filters, sample-and-hold circuits and adder consist of digital circuits.

6. A method of demodulating a frequency-shifted input signal varied between two frequencies $f_1$ and $f_2$, comprising the steps of:
   multiplying said input signal with a first signal having a predetermined frequency fc between said frequencies $f_1$ and $f_2$ to obtain a first component;
   multiplying said input signal with a second signal in quadrature with said first signal to obtain a second component;
   delaying said first and second components to obtain first and second delayed components;
   multiplying said first component with said second delayed component and said second component with said first delayed component to obtain first and second products respectively; and
   summing said first and second products.

7. The method of claim 6 wherein $f_c$ is the arithmetic average of $f_1$ and $f_2$.

* * * * *